(12) United States Patent
Xu et al.

(10) Patent No.: US 10,509,939 B2
(45) Date of Patent: Dec. 17, 2019

(54) OPTICAL SIGNAL MODULATION CIRCUIT AND MODULATION METHOD THEREOF, ARRAY SUBSTRATE, DISPLAY SUBSTRATE AND DISPLAY DEVICE

(71) Applicant: BOE TECHNOLOGY GROUP CO., LTD., Beijing (CN)

(72) Inventors: Rui Xu, Beijing (CN); Haisheng Wang, Beijing (CN); Xiaoliang Ding, Beijing (CN); Yingming Liu, Beijing (CN); Shengji Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 218 days.

(21) Appl. No.: 15/679,233

(22) Filed: Aug. 17, 2017

(65) Prior Publication Data

US 2018/0075271 A1 Mar. 15, 2018

(30) Foreign Application Priority Data

Sep. 9, 2016 (CN) .......................... 2016 1 0814201

(51) Int. Cl.
*G06K 9/00* (2006.01)
*G09G 3/3241* (2016.01)
*G09G 3/20* (2006.01)
*G09G 3/3225* (2016.01)

(52) U.S. Cl.
CPC ....... *G06K 9/0004* (2013.01); *G06K 9/00087* (2013.01); *G09G 3/3241* (2013.01); *G09G 3/2092* (2013.01); *G09G 3/3225* (2013.01); *G09G 2310/08* (2013.01); *G09G 2330/028* (2013.01)

(58) Field of Classification Search
CPC ............. G06K 9/0004; G06K 9/00087; G09G 3/3241; G09G 3/3225; G09G 3/2092; G09G 2310/08; G09G 2330/028
See application file for complete search history.

(56) References Cited

U.S. PATENT DOCUMENTS

| | | | |
|---|---|---|---|
| 9,773,149 B2 * | 9/2017 | Liu | ..................... G06K 9/0008 |
| 2007/0131936 A1 | 6/2007 | Kang et al. | |
| 2014/0354597 A1 | 12/2014 | Kitchens, II et al. | |
| 2015/0022635 A1 * | 1/2015 | Mankowski | ......... H04N 5/2354 348/46 |

(Continued)

FOREIGN PATENT DOCUMENTS

| | | |
|---|---|---|
| CN | 104217763 A | 12/2014 |
| CN | 105893992 A | 8/2016 |

OTHER PUBLICATIONS

First Office Action for Chinese Patent Application No. 201610814201.4 dated Mar. 16, 2018.

*Primary Examiner* — John B Strege
(74) *Attorney, Agent, or Firm* — Calfee, Halter & Griswold LLP (57) ABSTRACT

An optical signal modulation circuit is configured to provide an optical signal for a fingerprint recognition process. The optical signal modulation circuit includes a first modulation unit and a first control unit. The first modulation unit has a control terminal connected to a signal output terminal of a first control unit, a signal input terminal connected to a first modulation signal terminal, and a signal output terminal connected to a light emitting element.

19 Claims, 2 Drawing Sheets

(56) References Cited

U.S. PATENT DOCUMENTS

| | | | |
|---|---|---|---|
| 2015/0146944 A1* | 5/2015 | Pi | H04L 63/0861 |
| | | | 382/124 |
| 2016/0063295 A1* | 3/2016 | Kim | G06K 9/001 |
| | | | 382/124 |
| 2017/0220838 A1* | 8/2017 | He | G06K 9/0004 |
| 2017/0324539 A1* | 11/2017 | Liu | H04B 10/50 |
| 2018/0046281 A1* | 2/2018 | Pi | A61B 5/02416 |

* cited by examiner

OPTICAL SIGNAL MODULATION CIRCUIT AND MODULATION METHOD THEREOF, ARRAY SUBSTRATE, DISPLAY SUBSTRATE AND DISPLAY DEVICE

CROSS-REFERENCE TO RELATED APPLICATIONS

The present application claims priority to Chinese Patent Application No. 201610814201.4, filed Sep. 9, 2016, and entitled "optical signal modulation circuit and modulation method thereof, array substrate, display substrate and display device", the entire contents of which are incorporated herein by reference.

TECHNICAL FIELD

The present disclosure relates to the field of display technology, and more particularly to an optical signal modulation circuit and a modulation method thereof, an array substrate, a display substrate and a display device.

BACKGROUND

An Organic Light Emitting Diode (OLED) is a current-type light emitting device, which has a self-luminous feature, a fast response, a wide viewing angle, a capability of being produced on a flexible substrate, and other excellent features. Due to this reason, OLEDs have seen wide application in display devices. With development of fingerprint recognition technology, at present, more and more OLED display devices have been equipped with fingerprint recognition function.

However, in a fingerprint recognition process of a display device with fingerprint recognition function, generally, a passive light source provides a light source of recognition of an optical signal for a fingerprint recognition module. That is, reflected ambient natural light is provided as an optical signal for the fingerprint recognition module. This manner of providing an optical signal for the fingerprint recognition module has a high requirement on the incident angle and incident amount of the ambient natural light. If the incident angle and incident amount of the ambient natural light do not satisfy the requirement, the fingerprint may not be accurately recognized. For example, when the incident angle of the ambient natural light is not proper, it may cause deviation in the reflected optical signal of the ambient natural light, and it is not possible to provide light irradiation in the accurate range for the fingerprint recognition module. As a result, the acquired optical signal of the fingerprint has an error, affecting the accurate recognition of the fingerprint. Or, due to other factors from the user, such as injured finger or humid environment, the incident amount of the ambient natural light does not satisfy the requirement, the fingerprint recognition module may not acquire apparent optical single of the fingerprint, affecting the accurate recognition of the fingerprint.

SUMMARY

The present disclosure provides an optical signal modulation circuit and a modulation method thereof, an array substrate, a display substrate and a display device.

A first aspect of the present disclosure provides an optical signal modulation circuit configured to provide an optical signal for a fingerprint recognition process, the optical signal modulation circuit including a first modulation unit and a first control unit, wherein the first modulation unit has a control terminal connected to a signal output terminal of a first control unit, a signal input terminal connected to a first modulation signal terminal, and a signal output terminal connected to a light emitting element;

the fingerprint recognition process includes an optical signal acquisition state and an optical signal non-acquisition state;

in the optical signal acquisition state, the first control unit controls the first modulation unit to turn on, a first modulation signal provided by the first modulation signal terminal is transmitted to the light emitting element via the first modulation unit, such that the first modulation signal controls the light emitting element to emit a modulated optical signal, and the modulated optical signal is provided to a fingerprint for recognizing the fingerprint; and in the optical signal non-acquisition state, the first control unit controls the first modulation unit to turn off, and controls the light emitting element not to emit light.

Based on the above optical signal modulation circuit, a second aspect of the present disclosure provides an optical signal modulation method, the optical signal modulation method including a plurality of modulation cycles, each of the modulation cycles including a first operation stage and a second operation stage; the first operation stage being in an optical signal acquisition state of a fingerprint recognition process; and the second operation stage being in an optical signal non-acquisition state of a fingerprint recognition process; wherein during the first operation stage, the first control unit controls the first modulation unit to turn on, a first modulation signal provided by the first modulation signal terminal is transmitted to the light emitting element via the first modulation unit, such that the first modulation signal controls the light emitting element to emit a modulated optical signal, the modulated optical signal is provided to a fingerprint for recognizing the fingerprint; and during the second operation stage, the first control unit controls the first modulation unit to turn off, and controls the light emitting element not to emit light.

Based on the above technical solution of the optical signal modulation circuit, a third aspect of the present disclosure provides an array substrate, including the above optical signal modulation circuit.

Based on the above technical solution of the array substrate, a fourth aspect of the present disclosure provides a display panel including the above array substrate.

Based on the above technical solution of the display panel, a fifth aspect of the present disclosure provides a display device including the above display panel.

BRIEF DESCRIPTION OF THE DRAWINGS

The drawings described herein are provided to provide a further understanding of the present disclosure and constitute a part of the present disclosure, and the illustrative embodiments of the present disclosure and its description are intended to be illustrative of the present disclosure and are not to be construed as limiting the present disclosure. In the drawings.

DETAILED DESCRIPTION

In order to illustrate the optical signal modulation circuit and the optical signal modulation method thereof, the array substrate, the display substrate and the display device provided by the embodiments of the present disclosure, detailed description will be given in conjunction with the accompanying drawings of the specification.

Figure 1:
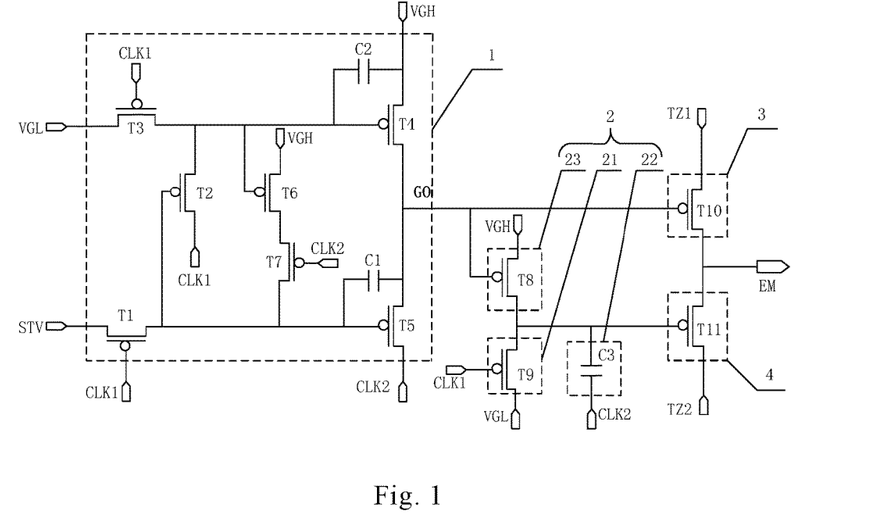
FIG. 1 is a structural schematic diagram of an optical signal modulation circuit provided by an embodiment of the present disclosure.

Referring to FIG. 1, the optical signal modulation circuit provided by the embodiment of the present disclosure is configured to provide an optical signal for a fingerprint recognition process. The optical signal modulation circuit includes a first modulation unit 3 and a first control unit 1.

The first modulation unit 3 has a control terminal connected to a signal output terminal of a first control unit 1, a signal input terminal connected to a first modulation signal terminal TZ1, and a signal output terminal connected to a light emitting element EM.

The fingerprint recognition process includes an optical signal acquisition state and an optical signal non-acquisition state.

In implementation, in the optical signal acquisition state, the first control unit 1 controls the first modulation unit 3 to turn on. A first modulation signal provided by the first modulation signal terminal TZ1 is transmitted to the light emitting element EM via the first modulation unit 3, such that the first modulation signal controls the light emitting element EM to emit a modulated optical signal. The modulated optical signal is provided to a fingerprint for recognizing the fingerprint.

In the optical signal non-acquisition state, the first control unit 1 controls the first modulation unit 3 to turn off, and controls the light emitting element EM not to emit light.

Accordingly from the above implementation, the optical signal modulation circuit provided by the embodiment of the present disclosure is configured to provide an optical signal for a fingerprint recognition process. During the optical signal acquisition stage, a first modulation signal provided by the first modulation signal terminal TZ1 is transmitted to the light emitting element EM via the first modulation unit 3, such that the light emitting element EM functions as an active light source. The light emitting element EM emits a modulated optical signal under the control of the first modulation signal, and the modulated optical signal is provided to a fingerprint for recognizing the fingerprint. Since the light intensity, optical signal frequency and the phase of the modulated optical signal may be properly regulated by the first modulation signal terminal TZ1 according to requirements for fingerprint recognition, the modulated optical signal may be a desirable light source for the fingerprint recognition. When the light intensity of the modulated optical signal is regulated within a reasonable range required for the fingerprint recognition, the modulated optical signal may be provided as an optical signal having a sufficient light intensity to the surface of the fingerprint, such that after the surface of the fingerprint is irradiated by the modulated optical signal, the surface of the fingerprint may reflect an optical signal from the fingerprint optical signal having a sufficient light intensity to a fingerprint recognition module, to ensure that the fingerprint recognition module may acquire an apparent optical signal from the fingerprint.

Moreover, when the optical signal frequency of the modulated optical signal is regulated within a frequency range far out of the optical signal frequency range of an ambient natural light, after surface of a fingerprint is irradiated by the modulated optical signal, the fingerprint optical signal reflected from the fingerprint to the fingerprint recognition module may be easily recognized. Thus, it may effectively eliminate the affection of fingerprint stray light signals reflected to the fingerprint recognition module after the surface of the fingerprint is irradiated by stray light having other frequencies such as the ambient natural light, and it may ensure that the fingerprint recognition module may acquire accurate an optical signal of the fingerprint.

In addition, in the optical signal modulation circuit provided by the embodiment of the present disclosure, the light emitting element EM, as an active light source, may emit a modulated optical signal under the control of the first modulation signal, and directly provide the modulated optical signal to a fingerprint for recognizing the fingerprint. Specifically, the modulated optical signal emitted by the light emitting element EM may be directly irradiated on the surface of the fingerprint, or transmitted to the surface of the fingerprint via other light transmission paths. Whether the modulated optical signal is directly irradiated on the surface of the fingerprint, or transmitted to the surface of the fingerprint via other light transmission paths, the modulated optical signal may be accurately irradiated on the surface of the fingerprint, without defining the incident angle of the light irradiation of the modulated optical signal. Compared with the method in the related art of providing an optical signal for recognition to the recognition module with a passive light source, the light emitting element EM in the optical light modulation circuit provided by the embodiment of the present disclosure may provide a proper optical signal for recognition for a fingerprint at any incident angle of the light irradiation to ensure accurate acquisition of an optical signal of the fingerprint.

In order to implement regulation of the light emitting element EM in the optical signal non-acquisition state, the optical signal modulation circuit provided by the embodiment of the present disclosure also includes a second control unit 2 and a second modulation unit 4. The second control unit 2 has a control terminal connected to the signal output terminal GO of the first control unit 1. The second modulation unit 4 has a control terminal connected to a signal output terminal of the second control unit 2, a signal input terminal connected to a second modulation signal terminal TZ2, and a signal output terminal connected to the light emitting element EM.

In implementation, in the optical signal acquisition state, the second control unit 2 controls the second modulation unit 4 to turn off. At this time, the first modulation unit 3 is in a turn on state, and a first modulation signal provided by the first modulation signal terminal TZ1 is transmitted to the light emitting element EM via the first modulation unit 3, such that the first modulation signal controls the light emitting element EM to emit a modulated optical signal, and provide the modulated optical signal to a fingerprint for recognizing the fingerprint.

In the optical signal non-acquisition state, the first modulation unit 3 is in a turn off state. The second control unit 2 controls the second modulation unit 4 to turn on. A second modulation signal provided by the second modulation signal terminal TZ2 is transmitted to the light emitting element EM via the second modulation unit 4, such that the second modulation signal controls the light emitting element EM not to emit light.

Accordingly from the above implementation, in the optical signal acquisition state and the optical signal non-acquisition state of the fingerprint recognition process, the optical signal modulation circuit provided by the embodiment may modulate and control the light emitting element EM. According to specific operation requirement of the optical signal modulation circuit, both of the first modulation signal provided by the first modulation signal terminal TZ1 and the second modulation signal provided by the second modulation signal terminal TZ2 may properly regulate the light emitting element EM, for example, may control whether the light emitting element EM emits light, control the light irradiation intensity, the optical signal frequency and the phase of the optical signal emitted by the light emitting element EM. Thus, it may facilitate further expanding the regulation range of the optical signal modulation circuit.

In one embodiment, in the optical signal modulation circuit provided by an embodiment of the present disclosure, the second control unit 2 includes a conduction module 21, a holding module 22 and a cutoff module 23.

The conduction module 21 has a control terminal connected to the first clock signal terminal CLK1, a signal input terminal connected to a first voltage control terminal VGL, and a signal output terminal connected to the control terminal of the second modulation unit 4. A first clock signal provided by the first clock signal terminal CLK1 controls the conduction module 21 to turn on or turn off. When the conduction module 21 is turned on, a first voltage control signal provided by the first voltage control terminal VGL is transmitted to the second modulation unit 4 via the conduction module 21, such that the first voltage control signal controls the second modulation unit 4 to turn on.

The cutoff module 23 has a control terminal connected to the signal output terminal GO of the first control unit 1, a signal input terminal connected to a second voltage control terminal VGH, and a signal output terminal connected to the control terminal of the second modulation unit 4. The first control unit 1 also controls the cutoff module 23 to turn on or turn off. When the cutoff module is turned on, a second voltage control signal provided by the second voltage control terminal VGH is transmitted to the second modulation unit 4, such that the second voltage control signal controls the second modulation unit 4 to turn off.

The holding module 22 has a signal input terminal connected to a second clock signal terminal CLK2, a signal output terminal connected to the control terminal of the second modulation unit 4. A second clock signal provided by the second clock signal terminal CLK2 is configured to turn on or turn off the holding module 22. When the holding module 22 is turned on, the holding module 22 controls the second modulation unit 4 to maintain turning on.

It should be noted that the holding module 22 in the above embodiment is a compensation capacitor. Each of the first modulation unit 3, the second modulation unit 4, the conduction module 21 and the cutoff module 23 is a junction field effect transistor, a MOS field effect transistor, or a thin film transistor.

In addition, in the above embodiment, the first modulation unit 3, the second modulation unit 4, the conduction module 21 and the cutoff module 23 may be turned on at a high level voltage or at a low level voltage, depending on the specific modulation device of the first modulation unit 3 and the second modulation unit 4. For example, when each of the first modulation unit 3, the second modulation unit 4, the conduction module 21 and the cutoff module 23 is a thin film transistor, the voltage signal provided by the first voltage control terminal VGL is a low level voltage signal, and the voltage signal provided by the second voltage control terminal VGH is a high level voltage signal. Each of the first modulation unit 3, the second modulation unit 4, the conduction module 21 and the cutoff module 23 is turned on under control of a low level voltage signal.

The specific structure of the first control unit 1 may be various, as long as the output signal of the signal output terminal of the first control unit 1 may control the cutoff module 23 to turn on or turn off while controlling the first modulation unit 3 to turn on or turn off. For example, referring to FIG. 1, the first control unit 1 includes a first thin film transistor T1, a second thin film transistor T2, a third thin film transistor T3, a fourth thin film transistor T4, a fifth thin film transistor T5, a sixth thin film transistor T6, a seventh thin film transistor T7, a first capacitor C1 and a second capacitor C2.

The first thin film transistor T1 has a control terminal connected to the first clock signal terminal CLK1, a signal input terminal connected to an enable signal terminal STV, and a signal output terminal connected to a control terminal of the fifth thin film transistor T5.

The second thin film transistor T2 has a control terminal connected to the control terminal of the fifth thin film transistor T5, a signal input terminal connected to the first clock signal terminal CLK1, and a signal output terminal connected to a control terminal of the fourth thin film transistor T4.

The third thin film transistor T3 has a control terminal connected to the first clock signal terminal CLK1, a signal input terminal connected to the first voltage control terminal VGL, and a signal output terminal connected to the control terminal of the fourth thin film transistor T4.

The fourth thin film transistor T4 has a signal input terminal connected to the second voltage control terminal VGH, and a signal output terminal connected to the control terminal of the first modulation unit 3.

The fifth thin film transistor T5 has a signal input terminal connected to the second clock signal terminal CLK2, and a signal output terminal connected to the control terminal of the first modulation unit 3.

The sixth thin film transistor T6 has a control terminal respectively connected to the output terminal of the second thin film transistor T2 and the output terminal of the third thin film transistor T3, a signal input terminal connected to the second voltage control terminal VGH, and a signal output terminal connected to a signal input terminal of the seventh thin film transistor T7.

The seventh thin film transistor T7 has a control terminal connected to the second clock signal terminal CLK2, and a signal output terminal connected to the a first electrode of the second capacitor C2. The second capacitor C2 has a second electrode connected to the second voltage control terminal VGH.

The first capacitor C1 has a first electrode respectively connected to the output terminal of the second thin film transistor T2 and the output terminal of the third thin film transistor T3, and a second electrode connected to the output terminal of the fifth thin film transistor T5.

Figure 2:
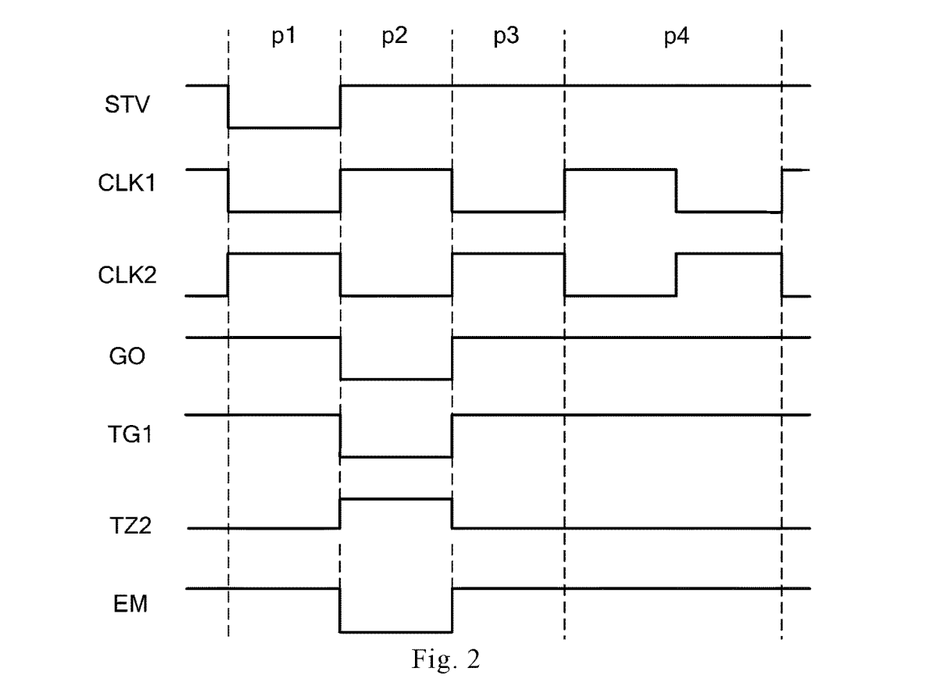
FIG. 2 is a first control time sequence diagram of an optical signal modulation circuit provided by an embodiment of the present disclosure.

In implementation, referring to FIG. 2, corresponding to a plurality of fingerprint recognition processes, the optical signal modulation circuit has a plurality of modulation cycles. Each modulation cycle includes a first operation stage p2 and a second operation stage. The first operation stage is in an optical signal acquisition state of a fingerprint recognition process, and the second operation stage is in an optical signal non-acquisition state of a fingerprint recognition process.

During the first operation stage p2 of each modulation cycle, a first clock signal provided by the first clock signal terminal CLK1 controls the conduction module 21 to turn off. A second clock signal provided by the second clock signal terminal CLK2 controls the holding module to turn off. The first control unit 1 controls the cutoff module 23 to turn on. A second voltage control signal provided by the second voltage control terminal VGH is transmitted to the second modulation unit 4, such that the second voltage control signal controls the second modulation unit 4 to turn off.

The second operation stage includes a first operation period p1, a second operation period p3 and a third operation period p4. The optical signal non-acquisition state includes an initialization state, a signal storage state and a compensation state. The first operation period p1 is in the initialization state. The second operation period p3 is in the signal storage state. The third operation period p4 is in the compensation state.

During the first operation period p1 and the second operation period p3, the first control unit controls the first modulation unit 3 to turn off. The second clock signal terminal CLK2 provides a second clock signal, such that the second clock signal controls the holding module 22 to turn off. The first clock signal terminal CLK1 provides a first clock signal, such that the first clock signal controls the conduction module 21 to turn on. The first voltage control terminal VGL provides a first voltage control signal. The first voltage control signal is transmitted to the second modulation unit 4 via the conduction module 21, such that the first voltage control signal controls the second modulation unit 4 to turn on. The second modulation signal terminal TZ2 provides a second modulation signal. The second modulation signal is transmitted to the light emitting element EM via the second modulation unit 4, such that the second modulation signal controls the light emitting element EM not to emit light.

During the third operation period p4, the first control unit 1 controls the first modulation unit 3 to turn off. The first clock signal terminal CLK1 provides a first clock signal, such that the first clock signal controls the conduction module 21 to turn off. The second clock signal terminal CLK2 provides a second clock signal, such that the second clock signal controls the holding module 22 to start.

In the above embodiment, at a same time moment, the voltage signal of the first clock signal is opposite to the voltage signal of the second clock signal. In one embodiment, the first clock signal and the second clock signal have same cycles, and the duty ratio of the first clock signal and the duty ratio of the second clock signal are both 50%. At a same time moment, the first clock signal is delayed by half a cycle with respect to the second clock signal. Alternatively, at a same time moment, the second clock signal is delayed by half a cycle with respect to the first clock signal.

It should be noted that, in order to improve the accuracy in acquisition of the optical signal of the fingerprint, in the embodiment, when the optical signal modulation circuit is in the optical signal acquisition state, the first modulation signal provided by the first modulation signal terminal TZ1 is a low level square wave signal.

Figure 3:
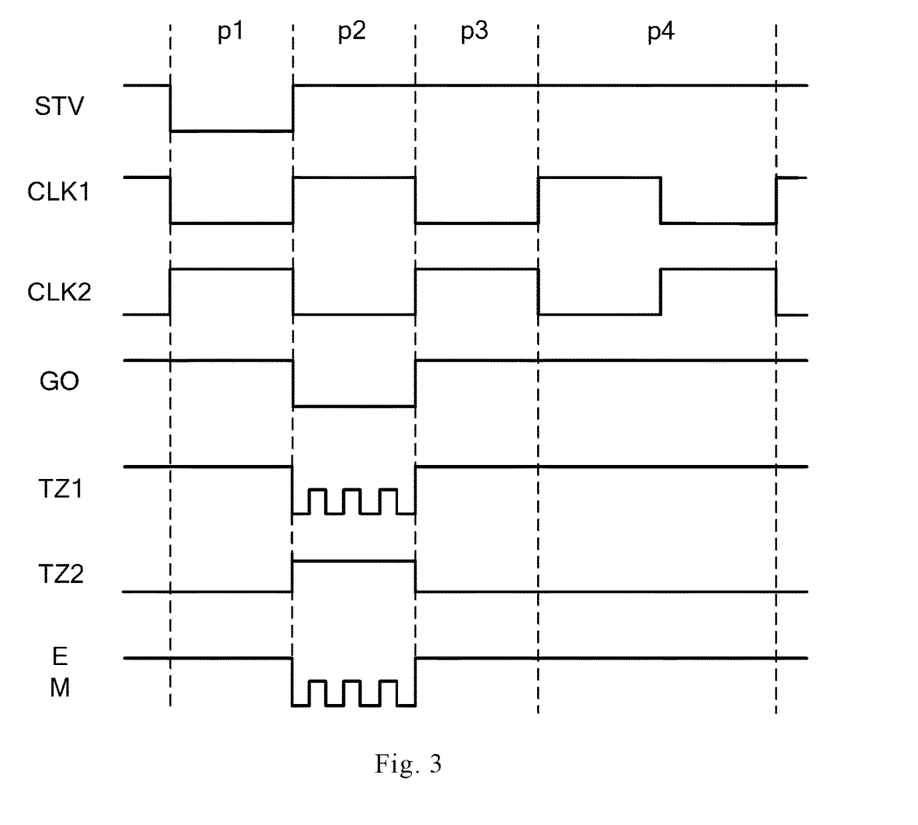
FIG. 3 is a second control time sequence diagram of an optical signal modulation circuit provided by an embodiment of the present disclosure.

Referring to FIG. 3, in the optical light acquisition state, the first modulation signal terminal TZ1 provides a low level square wave signal, such that the low level square wave signal may control the light emitting element EM to emit a modulated optical signal flickering with changed brightness. The specific light irradiation intensity, optical signal frequency and phase of the modulated optical signal when the modulated optical signal is flickering with changed brightness may be regulated through the first modulation signal terminal TZ1, such that the light emitting element EM may provide a recognition optical signal desirable for fingerprint recognition for a fingerprint, under the regulation of the first modulation signal provided by the first modulation signal terminal TZ1, and in turn, the accuracy in acquisition of the optical signal of the fingerprint in the fingerprint recognition module may be improved.

An embodiment of the present disclosure also provides an optical signal modulation method, which is applied in the optical signal modulation circuit of the above embodiment. The modulation method includes a plurality of modulation cycles. Each modulation cycle includes a first operation stage p2 and a second operation stage. The first operation stage p2 is in an optical signal acquisition state of a fingerprint recognition process. The second operation stage is in an optical signal non-acquisition state of a fingerprint recognition process.

During the first operation stage p2, the first control unit 1 controls the first modulation unit 3 to turn on. A first modulation signal provided by the first modulation signal terminal TZ1 is transmitted to the light emitting element EM via the first modulation unit 3, such that the first modulation signal controls the light emitting element EM to emit a modulated optical signal. The modulated optical signal is provided to a fingerprint for recognizing the fingerprint.

During the second operation stage, the first control unit 1 controls the first modulation unit 3 to turn off, and controls the light emitting element EM not to emit light.

The optical signal modulation method provided by the present embodiment is implemented by the optical signal modulation circuit provided by the above embodiment, and has the same advantageous effect as the optical signal modulation circuit in the above embodiment, which will not be repeated herein.

It should be noted that, still referring to FIG. 1, the optical signal modulation method provided by the present embodiment is applied in the optical signal modulation circuit. The optical signal modulation circuit also includes a second control unit 2 and a second modulation unit 4.

The second control unit 2 has a control terminal connected to the signal output terminal GO of the first control unit 1.

The second modulation unit 4 has a control terminal connected to a signal output terminal of the second control unit 2, a signal input terminal connected to a second modulation signal terminal TZ2, and a signal output terminal connected to the light emitting element EM.

The optical signal modulation method provided by the present embodiment also includes the following stages.

During the first operation stage p2, the second control unit 2 controls the second modulation unit 4 to turn off.

During the second operation stage, the second control unit 2 controls the second modulation unit 4 to turn on. A second modulation signal provided by the second modulation signal terminal TZ2 is transmitted to the light emitting element EM via the second modulation unit 4, such that the second modulation signal controls the light emitting element EM not to emit light.

It should be noted that, still referring to FIG. 1, the optical signal modulation method provided by the present embodiment is applied in the optical signal modulation circuit. In one embodiment, the second control unit 2 includes a conduction module 21, a holding module 22 and a cutoff module 23.

The conduction module 21 has a control terminal connected to the first clock signal terminal CLK1, a signal input terminal connected to a first voltage control terminal VGL, and a signal output terminal connected to the control terminal of the second modulation unit 4. The cutoff module 23 has a control terminal connected to the signal output terminal GO of the first control unit 1, a signal input terminal connected to a second voltage control terminal VGH, and a signal output terminal connected to the control terminal of the second modulation unit 4. The holding module 22 has a signal input terminal connected to a second clock signal terminal CLK2, a signal output terminal connected to the control terminal of the second modulation unit 4.

The first operation stage p2 of each modulation cycle also includes: a first clock signal provided by the first clock signal terminal CLK1 controls the conduction module 21 to turn off. A second clock signal provided by the second clock signal terminal CLK2 controls the holding module 22 to turn off. The first control unit 1 controls the cutoff module 23 to be turn on. A second voltage control signal provided by the second voltage control terminal VGH is transmitted to the second modulation unit 4, such that second voltage control signal controls the second modulation unit 4 to turn off.

The second operation stage includes a first operation period p1, a second operation period p3 and a third operation period p4. The optical signal non-acquisition state includes an initialization state, a signal storage state and a compensation state. The first operation period p1 is in the initialization state. The second operation period p3 is in the signal storage state. The third operation period p4 is in the compensation state.

During the first operation period p1 and the second operation period p3, the first control unit controls the first modulation unit 3 to turn off. The second clock signal terminal CLK2 provides a second clock signal, such that the second clock signal controls the holding module 22 to turn off. The first clock signal terminal CLK1 provides a first clock signal, such that the first clock signal controls the conduction module 21 to turn on. The first voltage control terminal VGL provides a first voltage control signal. The first voltage control signal is transmitted to the second modulation unit 4 via the conduction module 21, such that the first voltage control signal controls the second modulation unit 4 to turn on. The second modulation signal terminal TZ2 provides a second modulation signal. The second modulation signal is transmitted to the light emitting element EM via the second modulation unit 4, such that the second modulation signal controls the light emitting element EM not to emit light.

During the third operation period p4, the first control unit 1 controls the first modulation unit 3 to turn off. The first clock signal terminal CLK1 provides a first clock signal, such that the first clock signal controls the conduction module 21 to be turn off. The second clock signal terminal CLK2 provides a second clock signal, such that the second clock signal controls the holding module 22 to turn on.

In the optical signal modulation method of the above embodiment, at a same time moment, the voltage signal of the first clock signal is opposite to the voltage signal of the second clock signal. In one embodiment, the first clock signal and the second clock signal have same cycles, and the duty ratio of the first clock signal and the duty ratio of the second clock signal are both 50%. At a same time moment, the first clock signal is delayed by half a cycle with respect to the second clock signal. Alternatively, at a same time moment, the second clock signal is delayed by half a cycle with respect to the first clock signal.

In the optical signal modulation method of the above embodiment, the first control unit 1 includes a first thin film transistor T1, a second thin film transistor T2, a third thin film transistor T3, a fourth thin film transistor T4, a fifth thin film transistor T5, a sixth thin film transistor T6, a seventh thin film transistor T7, a first capacitor C1 and a second capacitor C2. The first thin film transistor T1 has a control terminal connected to the first clock signal terminal CLK1, a signal input terminal connected to an enable signal terminal STV, and a signal output terminal connected to a control terminal of the fifth thin film transistor T5. The second thin film transistor T2 has a control terminal connected to the control terminal of the fifth thin film transistor T5, a signal input terminal connected to the first clock signal terminal CLK1, and a signal output terminal connected to a control terminal of the fourth thin film transistor T4. The third thin film transistor T3 has a control terminal connected to the first clock signal terminal CLK1, a signal input terminal connected to the first voltage control terminal VGL, and a signal output terminal connected to the control terminal of the fourth thin film transistor T4. The fourth thin film transistor T4 has a signal input terminal connected to the second voltage control terminal VGH, and a signal output terminal connected to the control terminal of the first modulation unit 3. The fifth thin film transistor T5 has a signal input terminal connected to the second clock signal terminal CLK2, and a signal output terminal connected to the control terminal of the first modulation unit 3. The sixth thin film transistor T6 has a control terminal respectively connected to the output terminal of the second thin film transistor T2 and the output terminal of the third thin film transistor T3, a signal input terminal connected to the second voltage control terminal VGH, and a signal output terminal connected to a signal input terminal of the seventh thin film transistor T7. The seventh thin film transistor T7 has a control terminal connected to the second clock signal terminal CLK2, and a signal output terminal connected to the a first electrode of the second capacitor C2. The second capacitor C2 has a second electrode connected to the second voltage control terminal VGH. The first capacitor C1 has a first electrode respectively connected to the output terminal of the second thin film transistor T2 and the output terminal of the third thin film transistor T3, and a second electrode connected to the output terminal of the fifth thin film transistor T5.

In this case, the optical signal modulation method of an embodiment includes: during the first operation stage p2, the first clock signal terminal CLK1 provides a first clock signal to control the first thin film transistor T1 to turn off, and to control the third thin film transistor T3 to turn off. The second clock signal terminal CLK2 provides a second clock signal to control the seventh thin film transistor T7 to turn on, and control the first capacitor C1 discharges electricity.

The electricity discharged by the first capacitor C1 controls the second thin film transistor T2 to turn on. A first clock signal provided by the first clock signal terminal CLK1 is transmitted respectively to the first electrode of the second capacitor C2, the fourth thin film transistor T4 and the sixth thin film transistor T6 via the second thin film transistor T2, such that the first clock signal controls the fourth thin film transistor T4 to turn off, controls the sixth thin film transistor T6 to turn off, and controls the second capacitor C2 to be charged.

The electricity discharged by the first capacitor C1 controls the fifth thin film transistor T5 to turn on. A second clock signal provided by the second clock signal terminal CLK2 is transmitted respectively to the first modulation unit 3 and the cutoff modulation 23 via the fifth thin film transistor T5, such that the first voltage control signal controls the first modulation unit 3 to turn on, and controls the cutoff module 23 to turn on.

During the first operation period p1 of the second operation stage, a first clock signal provided by the first clock signal terminal CLK1 controls the first thin film transistor T1 to turn on, and controls the third thin film transistor T3 to turn on. A second clock signal provided by the second clock signal terminal CLK2 controls the seventh thin film transistor T7 to turn off.

The enable signal terminal STV provides an enable signal. The enable signal is transmitted respectively to the first electrode of the first capacitor C1, the second thin film transistor T2 and the fifth thin film transistor T5 via the first thin film transistor T1, such that the enable signal controls the second thin film transistor T2 to turn on, controls the fifth thin film transistor T5 to turn on, and controls the first capacitor C1 to be charged.

A first clock signal provided by the first clock signal terminal CLK1 is transmitted respectively to the first electrode of the second capacitor C2, the fourth thin film transistor T4 and the sixth thin film transistor T6 via the second thin film transistor T2. A first voltage control signal provided by the first voltage control terminal VGL is transmitted to the first electrode of the second capacitor C2, the fourth thin film transistor T4 and the sixth thin film transistor T6 via the third thin film transistor T3. The first clock signal and the first voltage control signal form a signal to control the fourth thin film transistor T4 to turn on, control the sixth thin film transistor T6 to turn on, and control the second capacitor C2 to be charged.

A second voltage control signal provided by the second voltage control terminal VGH is transmitted respectively to the first modulation unit 3 and the cutoff module 23 via the fourth thin film transistor T4. A second clock signal provided by the second clock signal terminal CLK2 is transmitted respectively to the first modulation unit 3 and the cutoff module 23 via the fifth thin film transistor T5. The second voltage control signal and the second clock signal form a signal to control the first modulation unit 3 to turn off, and control the cutoff module 23 to turn off.

During the second operation period p3 of the second operation stage, a first clock signal provided by the first clock signal terminal CLK1 controls the first thin film transistor T1 to turn on, and controls the third thin film transistor T3 to turn on. A second clock signal provided by the second clock signal terminal CLK2 controls the seventh thin film transistor T7 to turn off.

The enable signal terminal STV provides an enable signal. The enable signal is transmitted respectively to the first electrode of the first capacitor C1, the second thin film transistor T2 and the fifth thin film transistor T5 via the first thin film transistor T1, such that the enable signal controls the second thin film transistor T2 to turn off, controls the fifth thin film transistor T5 to turn off, and controls the first capacitor C1 to be charged. A first voltage control signal provided by the first voltage control terminal VGL is transmitted to the first electrode of the first capacitor C1, the fourth thin film transistor T4 and the sixth thin film transistor T6 via the third thin film transistor T3, such that the first voltage control signal controls the fourth thin film transistor T4 to turn on, controls the sixth thin film transistor T6 to turn on and controls the second capacitor C2 to be charged. A second voltage control signal provided by the second voltage control terminal VGH is transmitted respectively to the first modulation unit 3 and the cutoff module 23 via the fourth thin film transistor T4, such that the second voltage control signal controls the first modulation unit 3 to turn off and controls the cutoff module 23 to turn off.

During the third operation period p4 of the second operation stage, a first clock signal provided by the first clock signal terminal CLK1 controls the first thin film transistor T1 to turn off, and controls the third thin film transistor T3 to turn off. A second clock signal provided by the second clock signal terminal CLK2 controls the seventh thin film transistor T7 to turn off.

The first capacitor C1 discharges electricity. The electricity discharged by the first capacitor C1 controls the second thin film transistor T2 to turn off. The second capacitor C2 discharges electricity. The electricity discharged by the second capacitor C2 controls the fourth thin film transistor T4 to turn on, and controls the sixth thin film transistor T6 to turn on. A second voltage control signal provided by the second voltage control terminal VGH is transmitted respectively to the first modulation unit 3 and the cutoff module 23 via the fourth thin film transistor T4, such that the second voltage control signal controls the first modulation unit 3 to turn off, and controls the cutoff module 23 to turn off.

Specifically, in the optical signal modulation method provided by the above embodiment, the first voltage control signal is a low level voltage signal and the second voltage control signal is a high level voltage signal.

During the first operation stage p2, the first clock signal is a high level voltage signal, the second clock signal is a low level voltage signal, and the enable signal is a high level voltage signal.

During the first operation period p1 of the second operation stage, the first clock signal is a low level voltage signal, the second clock signal is a high level voltage signal, and the enable signal is a low level voltage signal.

During the second operation period p3 of the second operation stage, the first clock signal is a low level voltage signal, the second clock signal is a high level voltage signal, and the enable signal is a high level voltage signal.

During the third operation period p4 of the second operation stage, the first clock signal is a high level voltage signal, the second clock signal is a low level voltage signal, and the enable signal is a high level voltage signal.

It should be noted that, in order to improve the accuracy in acquisition of the optical signal of the fingerprint, in the optical signal modulation method provided by the present embodiment, when the optical signal modulation circuit is in the first operation stage p2, the first modulation signal provided by the first modulation signal terminal TZ1 is a low level square wave signal. The low level square wave signal may control the light emitting element EM to emit a modulated optical signal flickering with changed brightness. The specific light irradiation intensity, optical signal frequency and phase of the modulated optical signal when the modulated optical signal is flickering with changed brightness may be regulated through the first modulation signal terminal TZ1, such that the light emitting element EM may provide a recognition optical signal desirable for fingerprint recognition for a fingerprint, under the regulation of the first modulation signal provided by the first modulation signal terminal TZ1, and in turn, the accuracy in acquisition of the optical signal of the fingerprint in the fingerprint recognition module may be improved.

An embodiment of the present disclosure also provides an array substrate, including the optical signal modulation circuit provided by the above embodiment. The optical signal modulation circuit of the array substrate has the same advantageous effect as the optical signal modulation circuit in the above embodiment, which will not be repeated herein.

An embodiment of the present disclosure also provides a display panel, including the array substrate provided by the above embodiment. The arrays substrate of the display panel has the same advantageous effect as the arrays substrate in the above embodiment, which will not be repeated herein.

In one embodiment, when the display panel is an OLED display panel, in order to implement fingerprint recognition on a full screen of the OLED display panel, an optical signal modulation circuit provided by the above embodiment may be disposed in each pixel compensation unit of the array substrate of the OLED display panel, and the OLED device in the OLED display panel is taken as a light emitting element in the optical signal modulation circuit. Thus, when the OLED display panel is in a non-display state, that is, when the OLED display panel is in a fingerprint recognition stage before a display stage, and fingerprint recognition is performed at any position on the OLED display panel, in the pixel compensation unit at the corresponding position where the fingerprint is pressed, the optical signal modulation circuit may control the OLED device at that position to emit light, to provide proper modulated optical signal for the acquisition of the optical signal of the fingerprint, and facilitate accurate acquisition of the optical signal of the fingerprint by the fingerprint recognition module.

Moreover, with the regulation of the modulated signal by the first modulation signal terminal TZ1 and the second modulation signal terminal TZ2, after the fingerprint recognition is completed, the optical signal modulation circuit is configured to provide a light driving signal for the light emission of the OLED device in the display state for the OLED display panel, such that the OLED device provides an optical signal for the display of the OLED display panel.

In addition, when the OLED display panel is in the display state, and fingerprint recognition is required to be performed at any position of the OLED display panel, that is, when fingerprint recognition is to be performed on a full screen of the OLED display panel, in order to separately provide a display optical signal to the OLED display panel and a modulated optical signal to the fingerprint recognition module, in the OLED display panel provided by the embodiment of the present disclosure, an optical signal modulation circuit provided by the above embodiment is provided in each pixel compensation unit of the array substrate of the OLED display panel, to implement the fingerprint recognition at any position of the full screen of the OLED display panel, and the light emitting element EM of the optical signal modulation circuit is disposed in a non-light-transmission region of the OLED display panel, and the light emitting element EM transmits a modulated optical signal to a surface of a fingerprint through other light transmission paths. In order to provide proper modulated optical signal for accurate acquisition of the optical signal of the fingerprint, the display devices in the OLED display panel is disposed in a light transmission region of the OLED display panel, to provide a display optical signal for the OLED display panel. The light emitting element EM may be any light source that is capable of emitting a modulated optical signal, such as an infrared light source that may be modulated.

An embodiment of the present disclosure also provides a display device, including the display panel provided by the above embodiment. The display panel of the display device has the same advantageous effect as the display panel in the above embodiment, which will not be repeated herein.

The foregoing are merely specific embodiments of the present disclosure and are not intended to limit the present disclosure. Those skilled in the art may conceive variations or substitutions within the range disclosed by the present disclosure which should be covered by the protection scope of the present disclosure. Therefore, the scope of the protection scope of the present disclosure should be defined by the protection scope of the claims.

What is claimed is:

1. An optical signal modulation circuit configured to provide an optical signal for a fingerprint recognition process, the optical signal modulation circuit comprising a first modulation unit and a first control unit, wherein the first modulation unit comprises a control terminal connected to a signal output terminal of a first control unit, a signal input terminal connected to a first modulation signal terminal, and a signal output terminal connected to a light emitting element;

the fingerprint recognition process comprises an optical signal acquisition state and an optical signal non-acquisition state;

in the optical signal acquisition state, the first control unit controls the first modulation unit to turn on, a first modulation signal provided by the first modulation signal terminal is transmitted to the light emitting element via the first modulation unit, such that the first modulation signal controls the light emitting element to emit a modulated optical signal, and the modulated optical signal is provided to a fingerprint for recognizing the fingerprint; and in the optical signal non-acquisition state, the first control unit controls the first modulation unit to turn off, and controls the light emitting element not to emit light; and the optical signal modulation circuit comprises a second control unit and a second modulation unit, wherein the second control unit comprises a control terminal connected to the signal output terminal of the first control unit, the second modulation unit comprises a control terminal connected to a signal output terminal of the second control unit, a signal input terminal connected to a second modulation signal terminal, and a signal output terminal connected to the light emitting element;

in the optical signal acquisition state, the second control unit controls the second modulation unit to turn off; and in the optical signal non-acquisition state, the second control unit controls the second modulation unit to turn on, a second modulation signal provided by the second modulation signal terminal is transmitted to the light emitting element via the second modulation unit, such that the second modulation signal controls the light emitting element not to emit light.

2. The optical signal modulation circuit of claim 1, wherein the second control unit comprises a conduction module, a holding module and a cutoff module;

the conduction module comprises a control terminal connected to the first clock signal terminal, a signal input terminal connected to a first voltage control terminal, and a signal output terminal connected to the control terminal of the second modulation unit; a first clock signal provided by the first clock signal terminal controls the conduction module to turn on or turn off, when the conduction module is turned on, a first voltage control signal provided by the first voltage control terminal is transmitted to the second modulation unit via the conduction module, such that the first voltage control signal controls the second modulation unit to turn on;

the cutoff module comprises a control terminal connected to the signal output terminal of the first control unit, a signal input terminal connected to a second voltage control terminal, and a signal output terminal connected to the control terminal of the second modulation unit; the first control unit further controls the cutoff module to turn on or turn off, when the cutoff module is turned on, a second voltage control signal provided by the second voltage control terminal VGH is transmitted to the second modulation unit, such that the second voltage control signal controls the second modulation unit to turn off; and the holding module comprises a signal input terminal connected to a second clock signal terminal, a signal output terminal connected to the control terminal of the second modulation unit; a second clock signal provided by the second clock signal terminal is configured to turn on or turn off the holding module, when the holding module is turned on, the holding module controls the second modulation unit to maintain turning on.

3. The optical signal modulation circuit of claim 2, wherein the voltage signal provided by the first voltage control terminal is a low level voltage signal, and the voltage signal provided by the second voltage control terminal is a high level voltage signal; and each of the first modulation unit, the second modulation unit, the conduction module and the cutoff module is controlled to turn on under a low level voltage signal.

4. The optical signal modulation circuit of claim 2, wherein at a same time moment, the voltage signal of the first clock signal is opposite to the voltage signal of the second clock signal.

5. The optical signal modulation circuit of claim 4, wherein the first clock signal and the second clock signal have same cycles, and a duty ratio of the first clock signal and a duty ratio of the second clock signal are both 50%, at a same time moment, the first clock signal is delayed by half a cycle with respect to the second clock signal; or, at a same time moment, the second clock signal is delayed by half a cycle with respect to the first clock signal.

6. The optical signal modulation circuit of claim 1, wherein in the optical signal acquisition state, the first modulation signal provided by the first modulation signal terminal is a low level square wave signal.

7. The optical signal modulation circuit of claim 6, wherein the first control unit comprises a first thin film transistor, a second thin film transistor, a third thin film transistor, a fourth thin film transistor, a fifth thin film transistor, a sixth thin film transistor, a seventh thin film transistor, a first capacitor and a second capacitor;

the first thin film transistor comprises a control terminal connected to the first clock signal terminal, a signal input terminal connected to an enable signal terminal, and a signal output terminal connected to a control terminal of the fifth thin film transistor;

the second thin film transistor comprises a control terminal connected to the control terminal of the fifth thin film transistor, a signal input terminal connected to the first clock signal terminal, and a signal output terminal connected to a control terminal of the fourth thin film transistor;

the third thin film transistor comprises a control terminal connected to the first clock signal terminal, a signal input terminal connected to the first voltage control terminal, and a signal output terminal connected to the control terminal of the fourth thin film transistor;

the fourth thin film transistor comprises a signal input terminal connected to the second voltage control terminal, and a signal output terminal connected to the control terminal of the first modulation unit;

the fifth thin film transistor comprises a signal input terminal connected to the second clock signal terminal, and a signal output terminal connected to the control terminal of the first modulation unit;

the sixth thin film transistor comprises a control terminal respectively connected to the output terminal of the second thin film transistor and the output terminal of the third thin film transistor, a signal input terminal connected to the second voltage control terminal, and a signal output terminal connected to a signal input terminal of the seventh thin film transistor;

the seventh thin film transistor comprises a control terminal connected to the second clock signal terminal, and a signal output terminal connected to the a first electrode of the second capacitor; the second capacitor has a second electrode connected to the second voltage control terminal; and the first capacitor comprises a first electrode respectively connected to the output terminal of the second thin film transistor and the output terminal of the third thin film transistor, and a second electrode connected to the output terminal of the fifth thin film transistor.

8. An optical signal modulation method applied in the optical signal modulation circuit of claim 1, the optical signal modulation method comprising a plurality of modulation cycles, each of the modulation cycles comprising a first operation stage and a second operation stage; the first operation stage being in an optical signal acquisition state of a fingerprint recognition process; and the second operation stage being in an optical signal non-acquisition state of a fingerprint recognition process; wherein during the first operation stage, the first control unit controls the first modulation unit to turn on, a first modulation signal provided by the first modulation signal terminal is transmitted to the light emitting element via the first modulation unit, such that the first modulation signal controls the light emitting element to emit a modulated optical signal, the modulated optical signal is provided to a fingerprint for recognizing the fingerprint; and during the second operation stage, the first control unit controls the first modulation unit to turn off, and controls the light emitting element not to emit light.

9. The optical signal modulation method of claim 8, wherein the optical signal modulation circuit for applying the method further comprises a second control unit and a second modulation unit;

the second control unit comprises a control terminal connected to the signal output terminal of the first control unit;

the second modulation unit comprises a control terminal connected to a signal output terminal of the second control unit, a signal input terminal connected to a second modulation signal terminal, and a signal output terminal connected to the light emitting element;

the optical signal modulation method further comprises:

during the first operation stage, the second control unit controlling the second modulation unit to turn off; and during the second operation stage, the second control unit controlling the second modulation unit to turn on, a second modulation signal provided by the second modulation signal terminal being transmitted to the light emitting element via the second modulation unit, such that the second modulation signal controls the light emitting element not to emit light.

10. The optical signal modulation method of claim 9, wherein in the optical signal modulation circuit for applying the method, the second control unit comprises a conduction module, a holding module and a cutoff module;

the conduction module comprises a control terminal connected to the first clock signal terminal, a signal input terminal connected to a first voltage control terminal, and a signal output terminal connected to the control terminal of the second modulation unit; the cutoff module comprises a control terminal connected to the signal output terminal of the first control unit, a signal input terminal connected to a second voltage control terminal, and a signal output terminal connected to the control terminal of the second modulation unit; the holding module comprises a signal input terminal connected to a second clock signal terminal, a signal output terminal connected to the control terminal of the second modulation unit;

the first operation stage of each of the modulation cycles further comprises: a first clock signal provided by the first clock signal terminal controlling the conduction module to turn off; a second clock signal provided by the second clock signal terminal controlling the holding module to turn off; the first control unit controlling the cutoff module to turn on, a second voltage control signal provided by the second voltage control terminal being transmitted to the second modulation unit, such that second voltage control signal controls the second modulation unit to turn off;

the second operation stage comprises a first operation period, a second operation period and a third operation period; the optical signal non-acquisition state comprises an initialization state, a signal storage state and a compensation state; the first operation period is in the initialization state, the second operation period is in the signal storage state, and the third operation period is in the compensation state;

during the first operation period and the second operation period, the first control unit controls the first modulation unit to turn off, the second clock signal terminal provides a second clock signal, such that the second clock signal controls the holding module to turn off, the first clock signal terminal provides a first clock signal, such that the first clock signal controls the conduction module to turn on, the first voltage control terminal provides a first voltage control signal, the first voltage control signal is transmitted to the second modulation unit via the conduction module, such that the first voltage control signal controls the second modulation unit to turn on, and the second modulation signal terminal provides a second modulation signal, the second modulation signal is transmitted to the light emitting element via the second modulation unit, such that the second modulation signal controls the light emitting element not to emit light; and during the third operation period, the first control unit controls the first modulation unit to turn off, the first clock signal terminal provides a first clock signal, such that the first clock signal controls the conduction module to turn off, and the second clock signal terminal provides a second clock signal, such that the second clock signal controls the holding module to turn on.

11. The optical signal modulation method of claim 10, wherein at a same time moment, the voltage signal of the first clock signal is opposite to the voltage signal of the second clock signal.

12. The optical signal modulation method of claim 11, wherein the first clock signal and the second clock signal have same cycles, and a duty ratio of the first clock signal and a duty ratio of the second clock signal are both 50%, at a same time moment, the first clock signal is delayed by half a cycle with respect to the second clock signal; or, at a same time moment, the second clock signal is delayed by half a cycle with respect to the first clock signal.

13. The optical signal modulation method claim 10, wherein the first control unit comprises a first thin film transistor, a second thin film transistor, a third thin film transistor, a fourth thin film transistor, a fifth thin film transistor, a sixth thin film transistor, a seventh thin film transistor, a first capacitor and a second capacitor;

the first thin film transistor comprises a control terminal connected to the first clock signal terminal, a signal input terminal connected to an enable signal terminal, and a signal output terminal connected to a control terminal of the fifth thin film transistor;

the second thin film transistor comprises a control terminal connected to the control terminal of the fifth thin film transistor, a signal input terminal connected to the first clock signal terminal, and a signal output terminal connected to a control terminal of the fourth thin film transistor;

the third thin film transistor comprises a control terminal connected to the first clock signal terminal, a signal input terminal connected to the first voltage control terminal, and a signal output terminal connected to the control terminal of the fourth thin film transistor;

the fourth thin film transistor comprises a signal input terminal connected to the second voltage control terminal, and a signal output terminal connected to the control terminal of the first modulation unit;

the fifth thin film transistor comprises a signal input terminal connected to the second clock signal terminal, and a signal output terminal connected to the control terminal of the first modulation unit;

the sixth thin film transistor comprises a control terminal respectively connected to the output terminal of the second thin film transistor and the output terminal of the third thin film transistor, a signal input terminal connected to the second voltage control terminal, and a signal output terminal connected to a signal input terminal of the seventh thin film transistor;

the seventh thin film transistor comprises a control terminal connected to the second clock signal terminal, and a signal output terminal connected to the a first electrode of the second capacitor; and the second capacitor has a second electrode connected to the second voltage control terminal;

the first capacitor comprises a first electrode respectively connected to the output terminal of the second thin film transistor and the output terminal of the third thin film transistor, and a second electrode connected to the output terminal of the fifth thin film transistor;

during the first operation stage, the first clock signal terminal provides a first clock signal to control the first thin film transistor to turn off, and to control the third thin film transistor to turn off, the second clock signal terminal provides a second clock signal to control the seventh thin film transistor to turn on, and the first capacitor discharges electricity;

the electricity discharged by the first capacitor controls the second thin film transistor to turn on, a first clock signal provided by the first clock signal terminal is transmitted respectively to the first electrode of the second capacitor, the fourth thin film transistor and the sixth thin film transistor via the second thin film transistor, such that the first clock signal controls the fourth thin film transistor to turn off, controls the sixth thin film transistor to turn off, and controls the second capacitor to be charged;

the electricity discharged by the first capacitor controls the fifth thin film transistor to turn on, a second clock signal provided by the second clock signal terminal is transmitted respectively to the first modulation unit and the cutoff modulation via the fifth thin film transistor, such that the first voltage control signal controls the first modulation unit to turn on, and controls the cutoff module to turn on;

during the first operation period of the second operation stage, a first clock signal provided by the first clock signal terminal controls the first thin film transistor to turn on, and controls the third thin film transistor to turn on; a second clock signal provided by the second clock signal terminal controls the seventh thin film transistor to turn off;

the enable signal terminal provides an enable signal; and the enable signal is transmitted respectively to the first electrode of the first capacitor, the second thin film transistor and the fifth thin film transistor via the first thin film transistor, such that the enable signal controls the second thin film transistor to turn on, controls the fifth thin film transistor to turn on, and controls the first capacitor to be charged;

a first clock signal provided by the first clock signal terminal is transmitted respectively to the first electrode of the second capacitor, the fourth thin film transistor and the sixth thin film transistor via the second thin film transistor; a first voltage control signal provided by the first voltage control terminal is transmitted to the first electrode of the second capacitor, the fourth thin film transistor and the sixth thin film transistor via the third thin film transistor; and the first clock signal and the first voltage control signal form a signal to control the fourth thin film transistor to turn on, controls the sixth thin film transistor to turn on, and controls the second capacitor to be charged;

a second voltage control signal provided by the second voltage control terminal is transmitted respectively to the first modulation unit and the cutoff module via the fourth thin film transistor, a second clock signal provided by the second clock signal terminal is transmitted respectively to the first modulation unit and the cutoff module via the fifth thin film transistor, the second voltage control signal and the second clock signal form a signal to control the first modulation unit to turn off, and control the cutoff module to turn off;

during the second operation period of the second operation stage, a first clock signal provided by the first clock signal terminal controls the first thin film transistor to turn on, and controls the third thin film transistor to turn on; and a second clock signal provided by the second clock signal terminal controls the seventh thin film transistor to turn off;

the enable signal terminal provides an enable signal, the enable signal is transmitted respectively to the first electrode of the first capacitor, the second thin film transistor and the fifth thin film transistor via the first thin film transistor, such that the enable signal controls the second thin film transistor to turn off, controls the fifth thin film transistor to turn off, and controls the first capacitor to be charged; a first voltage control signal provided by the first voltage control terminal is transmitted to the first electrode of the first capacitor, the fourth thin film transistor and the sixth thin film transistor via the third thin film transistor, such that the first voltage control signal controls the fourth thin film transistor to turn on, controls the sixth thin film transistor to turn on and controls the second capacitor to be charged; and a second voltage control signal provided by the second voltage control terminal is transmitted respectively to the first modulation unit and the cutoff module via the fourth thin film transistor, such that the second voltage control signal controls the first modulation unit to turn off and controls the cutoff module to turn off;

during the third operation period of the second operation stage, a first clock signal provided by the first clock signal terminal controls the first thin film transistor to turn off, and controls the third thin film transistor to turn off, a second clock signal provided by the second clock signal terminal controls the seventh thin film transistor to turn off; and the first capacitor discharges electricity, the electricity discharged by the first capacitor controls the second thin film transistor to turn off, the second capacitor discharges electricity, the electricity discharged by the second capacitor controls the fourth thin film transistor to turn on, and controls the sixth thin film transistor to turn on, a second voltage control signal provided by the second voltage control terminal is transmitted respectively to the first modulation unit and the cutoff module via the fourth thin film transistor, such that the second voltage control signal controls the first modulation unit to turn off, and controls the cutoff module to turn off.

14. The optical signal modulation method of claim 13, wherein the first voltage control signal is a low level voltage signal and the second voltage control signal is a high level voltage signal;

during the first operation stage, the first clock signal is a high level voltage signal, the second clock signal is a low level voltage signal, and the enable signal is a high level voltage signal;

during the first operation period of the second operation stage, the first clock signal is a low level voltage signal, the second clock signal is a high level voltage signal, and the enable signal is a low level voltage signal;

during the second operation period of the second operation stage, the first clock signal is a low level voltage signal, the second clock signal is a high level voltage signal, and the enable signal is a high level voltage signal; and during the third operation period of the second operation stage, the first clock signal is a high level voltage signal, the second clock signal is a low level voltage signal, and the enable signal is a high level voltage signal.

15. An array substrate, comprising at least one optical signal modulation circuit of claim 1.

16. A display panel comprising the array substrate of claim 15.

17. The display panel of claim 16, wherein the display panel is an OLED display panel, an optical signal modulation circuit is disposed in each pixel compensation unit of the OLED display panel; and the OLED device in the OLED display panel is taken as a light emitting element in the optical signal modulation circuit.

18. The display panel of claim 16, wherein the display panel is an OLED display panel, an optical signal modulation circuit is disposed in each pixel compensation unit of the OLED display panel; and the light emitting element of the optical signal modulation circuit is disposed in a non-light-transmission region of the OLED display panel.

19. A display device, comprising a display panel of claim 16.

* * * * *